ical product, for example, to have a pleasing

United States Patent Office 3,409,570
Patented Nov. 5, 1968

3,409,570
STABILIZATION OF DYES IN A FILM COATING MATERIAL
Robert E. Dempski, Elkins Park, and Arnold D. Marcus, Philadelphia, Pa., assignors to Merck & Co., Inc., Rahway, N.J., a corporation of New Jersey
No Drawing. Filed Nov. 2, 1964, Ser. No. 408,346
4 Claims. (Cl. 260—17)

ABSTRACT OF THE DISCLOSURE

A red colored coating for tablets is made up of methyl cellulose as the principal film forming compound, the dye FDC Red #3 and as a stabilizing agent for the dye, polyvinylpyrrolidone or a copolymer of N-vinyl-5-methyl-2-oxazolidinone with vinyl acetate, or a copolymer of vinyl pyrrolidone with vinyl acetate.

---

This invention relates to the stabilization of coloring agents and more particularly to a dye containing film coating material whose color intensity is not adversely effected by sunlight or ultra-violet light.

To achieve market acceptance of certain products, it is sometimes desirable to color pills, tablets or other shaped cores and the like so as to enhance their physical appearance. It is highly desirable psychologically for a pharmaceutical product, for example, to have a pleasing appearance. This renders the product more acceptable for therapeutic administration. For the same reason, the coloring matter used must resist the effects of sunlight and ultra-violet radiation. A faded or speckled pill or tablet can have an unpleasant psychological effect, as can the storage and marketing of pills or tablets in other than transparent containers. Patients in need of self-administered medication will often avoid proper treatment if it appears unattractive to them.

It is therefore an object of this invention to provide a colored pill, tablet or other shaped core and the like, which will retain its pleasing colorful appearance during long storage periods and prolonged exposure to sunlight or ultra-violet radiation.

These and further objects and advantages of this invention will be apparent from the following description.

It has been discovered that the incorporation of certain agents into a colorful film forming composition suitable for coating certain products, inhibits the fading of the color contained therein, when said film coating is exposed to sunlight or ultra-violet light. Specifically the stabilization of certain coloring agents is achieved by incorporating either (a) polyvinylpyrrolidone or (b) a copolymer of vinylpyrrolidone and vinyl acetate or (c) a copolymer of N-vinyl-5-methyl-2-oxazolidinone with vinyl acetate, in a film containing a methyl cellulose compound together with a suitable dye.

Polyvinylpyrrolidone hereinafter referred to as PVP can be represented structurally as:

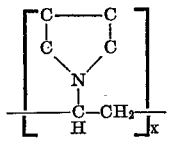

where $x$ is a number large enough to produce a molecular weight in the range of between about 10,000 to about 360,000.

The copolymer of vinylpyrrolidone and vinyl acetate used in this invention is preferably composed of these components in the range of from about 70:30 to about 30:70 vinylpyrrolidone to vinyl acetate respectively. This copolymer is commercially available with a degree of polymerization which makes the polymer an advantageous film forming compound as well as a dye stabilization agent.

N-vinyl-5-methyl-2-oxazolidinone can be represented structurally as:

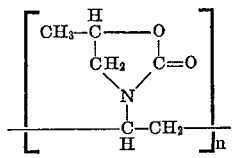

where $n$ is approximately 1100 to 1300. The uncombined compound is in the form of a white, free flowing powder with a molecular weight in the range of about 160,000 to about 170,000 and a melting point range of from about 250° C. to 295° C. N-vinyl-5-methyl-2-oxazolidinone employed in the dye stabilization of this invention is copolymerized with vinyl acetate. The resultant film forming copolymer can be structurally designated as follows:

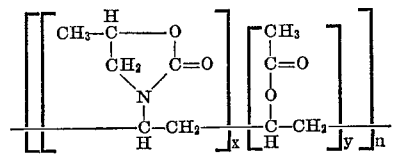

where $x$ and $y$ are numbers sufficiently large to produce a final copolymer containing about 50% by weight of each constituent. In the representative formula above a numerical value of $n$ is chosen so as to produce a K value or a degree of polymerization of 15 plus or minus 5. The indicated K value is calculated as follows:

$$\log R = \frac{0.000075K}{1+0.0015K} + 0.001K$$

where R, the relative viscosity, is measured for a 1% solution of the copolymer in a 50:50 methanol and water solution.

It has been learned that the above copolymers or PVP uniquely combines with the other constituents of this invention to produce a startling stability in certain dyes upon exposure to ultraviolet radiation. While not intending to be limited by the following proposed mechanism it is believed that these film forming compounds when incorporated into certain coloring formulations act as molecular complexing agents binding the dye into a hard, glossy film which inhibits the fading upon exposure to ultraviolet radiation which normally characterizes certain chromophoric compounds. In addition, the protective film exhibits a remarkably low degree of hygroscopicity while remaining water soluble and therefore is ideally suited for applications where solubility of the film in an aqueous medium is desired.

The stabilization of dyes which is characteristic of this invention can be initially observed by evaluation of dye color stability in solution. The following tabulation of experimental results were prepared by comparing the half-life of the particular dye used against solutions containing the same dye and a known amount of dye stabilizing agents. The standardized solutions were placed in glass stoppered test tubes and exposed to a source of intense electromagnetic radiation in the ultraviolet wave lengths. The color intensity of the solutions were measured periodically using a Cary recording electric spectrophotometer. The observation of a color intensity of onehalf of the initially observed value for the same sample is arbitrarily designated as the half-life of the particular solution. In each of the listed examples the dye designated as FDC Red #3 was used (1 mg. per 100 ml. of solution).

The copolymer used in this test was vinyl acetate with N-vinyl-5-methyl-2-oxazolidinone.

DYE HALF-LIFE COMPARISON TABLE

| Stabilizer (mg./100 ml.) | pH | Half-Life (hours) |
|---|---|---|
| 1. None | 5 | 6.5 |
| PVP (20) | 5 | 21.0 |
| Copolymer (10) | 5 | 11.5 |
| 2. None | 7 | 6.5 |
| PVP (20) | 7 | 12.5 |
| Copolymer (10) | 7 | 15.0 |
| 3. None | 9 | 6.5 |
| PVP | 9 | 14.5 |
| Copolymer (10) | 9 | 15.5 |

From the results shown in the above table it can be seen that both PVP and the copolymer described above significantly inhibit the fading by ultraviolet radiation of the dye. In addition it has been found that the stabilizer may be used in amounts as small as five times the amount of dye present in solution, and continues to be effective in amounts up to the limit of solubility of the stabilizer in solution. The preferred range of dye stabilizer is from 10 to 100 times the amount of dye.

The following are specific examples of preferred embodiments compositions according to its invention.

Example 1

A solvent of 50:50 anhydrous ethyl alcohol and chloroform together with 5.5% by weight of diethyl phthalate is used to prepare a 2.2% by weight solution of 50 centipoise methyl cellulose. To prepare the final coating solution 50 mg. of FDC Red #3, and 500 mg. of PVP with 5 ml. each of water and ethyl alcohol are added to 250 ml. of the 2.2% methyl cellulose solution.

The final solution was then used to coat one quarter inch standard curvature pharmaceutical tablets by spraying while the tablets were rotated at 30 r.p.m. in a 6 inch stainless steel coating pan. After coating the tablets they were dried at 51° C. for 18 hours. Samples of the finished tablets were then exposed to ultraviolet radiation from a transformer operated Hanovid 12 inch cylindrical ultraviolet lamp. The samples were placed approximately 18 inches from the source. One tablet in each test was left completely exposed while two others were protected respectively by amber and flint glass, all samples were thus exposed to the intense ultraviolet radiation for 72 hours.

The following table represents the visually observable characteristics of the tablets after such exposure. For the purposes of this test the observation was keyed to correspond to the following criteria; complete loss of color (1), heavy loss of color (2), moderate change (3), slight change (4), and no change as compared to an unexposed control sample (5). The control samples were coated in a manner similar to the above procedure with the dye stabilizer omitted.

TABLE 1.—EXPOSURE TO ULTRAVIOLET RADIATION

| Quality of Exposure | Without dye Stabilizer | With dye Stabilizer |
|---|---|---|
| Unprotected | 2 | 3 |
| Flint Glass | 3 | 4 |
| Amber Glass | 4 | 5 |

Example 2

The tablets prepared for this example were coated in the same manner as in Example 1, however 500 mg. of a copolymer of N-vinyl-5-methyl-2-oxazolidinone and vinyl acetate the dye stabilizer as was substituted for the 500 mg. of PVP in Example 1.

TABLE 2.—EXPOSURE TO ULTRAVIOLET RADIATION

| Quality of Exposure | Without dye Stabilizer | With dye Stabilizer |
|---|---|---|
| Unprotected | 2 | 3 |
| Flint Glass | 3 | 4 |
| Amber Glass | 4 | 5 |

Example 3

The same 2.2% methyl cellulose solution as prepared for Example 1 was made up with the addition of 0.5 gm. of titanium dioxide and 1.0 gm. of talc U.S.P. The other ingredients listed and PVP were added to a 250 ml. portion of the 2.2% methyl cellulose solution and then applied as a coating to standard curvature tablets as described in Example 1, and exposed. The results are tabulated here:

TABLE 3.—EXPOSURE TO ULTRAVIOLET RADIATION

| Quality of Exposure | Without dye Stabilizer | With dye Stabilizer |
|---|---|---|
| Unprotected | 2 | 3 |
| Flint Glass | 3 | 4 |
| Amber Glass | 4 | 5 |

Example 4

The tablets prepared for this example were coated in the same manner as in Example 3, however 500 mg. of a copolymer of N-vinyl-5-methyl-2-oxazolidinone and vinyl acetates as herein described was substituted for the 500 mg. of PVP.

TABLE 4.—EXPOSURE TO ULTRAVIOLET RADIATION

| Quality of Exposure | Without dye Stabilizer | With dye Stabilizer |
|---|---|---|
| Unprotected | 2 | 3 |
| Flint Glass | 3 | 4 |
| Amber Glass | 4 | 5 |

Example 5

The same 2.2% methyl cellulose solution as prepared for Example 1 was made up with the addition of 2.0 gm. of a non-lead containing bismuth oxychloride pigment. PVP and the other ingredients listed there were added to a 250 ml. portion of the 2.2% methyl cellulose solution and then applied as a coating to standard curvature tablets and exposed as described. The results are tabulated here:

TABLE 5.—EXPOSURE TO ULTRAVIOLET RADIATION

| Quality of Exposure | Without dye Stabilizer | With dye Stabilizer |
|---|---|---|
| Unprotected | 2 | 3 |
| Flint Glass | 3 | 3 |
| Amber Glass | 4 | 5 |

Example 6

The tablets prepared for this example were coated in the same manner as in Example 5, however 500 mg. of a copolymer of N-vinyl-5-methyl-2-oxazolidinone and vinyl acetate as herein described was substituted for the 500 mg. of PVP.

TABLE 6.—EXPOSURE TO ULTRAVIOLET RADIATION

| Quality of Exposure | Without dye Stabilizer | With dye Stabilizer |
|---|---|---|
| Unprotected | 2 | 3 |
| Flint Glass | 3 | 3 |
| Amber Glass | 4 | 5 |

Example 7

The tablets prepared for this example were coated in the same manner as Example 1, however, 500 mg. of a copolymer of vinyl acetate and vinylpyrrolidone in a 50:50 ratio as herein described was substituted for the 500 mg. of PVP.

TABLE 7.—EXPOSURE TO ULTRAVIOLET RADIATION

| Quality of Exposure | Without dye Stabilizer | With dye Stabilizer |
|---|---|---|
| Unprotected | 2 | 3 |
| Flint Glass | 3 | 4 |
| Amber Glass | 4 | 5 |

As can be seen from the foregoing examples the tablets coated with a film containing the dye stabilizers of the present invention show a substantial resistance to intense ultraviolet radiation exposure. It will be appreciated that the exposure conditions of the examples represents a considerable shelf life for the coated tablets. Under normal conditions of exposure in even non-protective types of containers the time required for any color change would be considerably longer for the tablets having a film containing a dye stabilizer than for a film without such protection.

Example 8

Another technique employed to demonstrate the herein disclosed dye stabilization activity involves the use of a Hunter Lab color difference meter. This instrument measures the color difference of the coated tablets in terms of L, a and b values according to the following formula:

$$(dE)^2 = (dL)^2 + (da)^2 + (db)^2$$

Where $dE$ is the change in lightness or darkness of reflected light, $a$ and $b$ are values of green or red and blue or yellow respectively.

The following table illustrates the effect of PVP dye stabilization in tablets coated as in Example 1 with the indicated changes in the PVP to dye ratio by weight.

TABLE 8
[(dE) values]

| Exposure time in hours | FDC Red #3 without Stabilizer | PVP to dye— | |
|---|---|---|---|
| | | 10:1 | 25:1 |
| 4 | 30 | 5 | 25 |
| 8 | 150 | 20 | 55 |
| 12 | 360 | 45 | 85 |
| 24 | 995 | 120 | 180 |

As the foregoing table shows there is an extremely great quantitative difference in the ability of the prepared film coatings to withstand color change upon exposure to ultraviolet radiation.

While this invention has been described with respect to specific embodiments thereof, it will be appreciated by one skilled in the art that equivalent compounds may be substituted for those described without departing from the spirit and scope of this invention.

The invention having been described, it is claimed:

1. A film coating for therapeutic products and the like comprising the dye FDC Red #3, methyl cellulose as the film forming composition, and a dye stabilization agent selected from the group consisting of polyvinylpyrrolidone, a copolymer of N-vinyl-5-methyl-2-oxazolidinone with vinyl acetate, and a copymer of vinyl pyrolidone with vinyl acetate.

2. A preparation for protectively coating shaped core products and the like with a colored film which is resistant to color fading upon exposure to ultraviolet radiation comprising a water-ethyl alcohol-chloroform solution of the dye FDC Red #3, a methyl cellulose film forming a compound, a plasticizer, and a dye stabilization agent selected from the group consisting of polyvinylpyrrolidone, a copolymer comprising, N-vinyl-5-methyl-2-oxazolidinone with vinyl acetate, in a 50:50 weight ratio, said polymer having a K value in the range of from about 10 to 20, and a copolymer of vinyl pyrolidone with vinyl acetate in a weight ratio range of from about 30:70 to 70:30 respectively.

3. A film coating for therapeutic compounds and the like comprising the FDC Red #3, in an amount sufficient to produce a desired color quality in the film coating, methyl cellulose as the organic film forming composition, a dye stabilization agent selected from the group consisting of polyvinylpyrrolidone, a copolymer with a degree of polymerization K valve in the range of from about 10 to about 20, comprising in a weight ratio of 50:50 N-vinyl-5-methyl-2-oxazolidinone with vinyl acetate, and a copolymer of vinyl pyrrolidone with vinyl acetate, said composition containing an additional pigment chosen from the group consisting of lead-free bismuth oxychloride, talc and titanium dioxide.

4. A light resistant colored film forming solution for application to shaped core compositions and the like comprising in water-alcohol-chloroform solution about 2.2% by weight of about 50 centipoise methyl cellulose, about 0.02% by weight FDC Red #3 dye, about 0.2% to about 2.0% by weight dye stabilization agent selected from the group consisting of polyvinylpyrrolidone, a copolymer of vinyl acetate and N-vinyl-5-methyl-2-oxazolidinone in a 50:50 weight ratio, said copolymer having a degree of polymerization in the range from about 10 to 20, and a copolymer of vinyl pyrrolidone with vinyl acetate in a weight ratio of 50:50; said light resistant film forming solution containing a pigment selected from the group consisting of lead-free bismuth oxychloride, talc and titanium dioxide.

References Cited

UNITED STATES PATENTS 2,300,470  11/1942  Sitzler _____ 8—61
3,030,273  4/1962  Zagnoli _____ 8—61

WILLIAM H. SHORT, Primary Examiner.

L. P. QUAST, Assistant Examiner.